June 10, 1952  A. D. COLE  2,600,209
ELECTRICAL NAVIGATION APPARATUS
Filed April 3, 1945
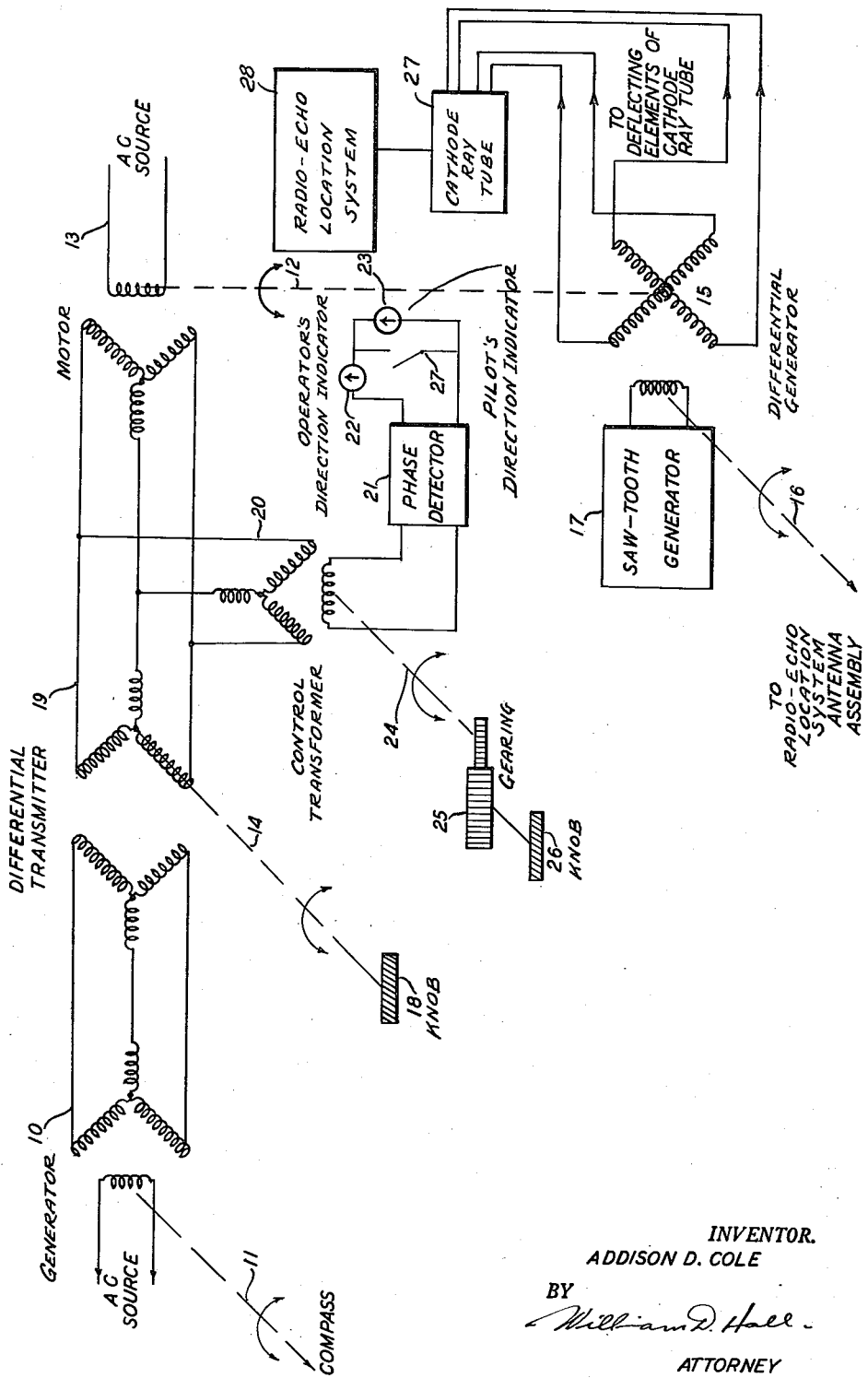
INVENTOR.
ADDISON D. COLE
BY
ATTORNEY Patented June 10, 1952

2,600,209

UNITED STATES PATENT OFFICE 2,600,209

ELECTRICAL NAVIGATION APPARATUS

Addison D. Cole, Cambridge, Mass., assignor, by mesne assignments, to the United States of America as represented by the Secretary of War Application April 3, 1945, Serial No. 586,422

9 Claims. (Cl. 343—5)

This invention relates to electrical apparatus and more particularly to an electronic navigation system to enable a plane to fly a collision course toward a target.

In bombing and navigation it is frequently desirable to fly a collision course toward a target, that is, a straight ground track which intersects the target. A necessary and sufficient condition for such a course is that the azimuth bearing of the target with respect to the plane remain unchanged.

One of the devices for determining the bearing of the plane with respect to a given target, is an apparatus for transmitting electromagnetic energy and is adapted to receive energy re-radiated or reflected from the target to the apparatus and to give a visual indication of the transmission of the energy in the form of pulses, and an indication of the energy received from the target. By means of a directional array or system for radiating or transmitting the energy and receiving the energy re-radiated or reflected from the target an accurate bearing or azimuth reading can be determined. Such an apparatus is shown for instance in the application of Luis W. Alvarez, Serial No. 542,287, filed June 27, 1944, entitled "Radio Distance and Direction Indicator," Patent No. 2,480,208, issued August 30, 1949.

When such apparatus is used in conjunction with bombing and navigation it is especially desirable that the operator of the target detection apparatus have a convenient means of informing the pilot of the plane the direction he should turn the plane, if necessary, in order that a desired course be followed. Such a means is called a pilot's direction indicator, hereinafter referred to as a PDI, which is ordinarily a center-scale direct current milliammeter properly marked to indicate the direction and number of degrees for the desired turn. Such instruments have been used considerably in the past with various means for controlling them.

One of the objects of my invention therefore is to present a system whereby the operator of the detection apparatus can, by means of the PDI, direct the plane on a given collision course toward a selected target.

Another of the objects of the invention is to enable the detection apparatus operator, by means of a series of preliminary corrections and adjustments, and turns by the pilot of the plane, to put the plane on a proper collision course with the selected target so that thereafter any deviation of the plane from this course will be automatically indicated to the pilot. This system takes into account any component of cross-wind tending to cause the plane to deviate from the course selected and indicates the drift angle caused by the component of the cross-wind.

My invention will best be understood by reference to the drawing in which:

The figure is a schematic view, partly diagrammatic, showing the principle of operation of my invention.

Inasmuch as my invention is used in conjunction with and as a part of a previously developed electronic target detection and presentation apparatus known as the north-stabilized PPI system, a brief explanation of this system will make the operation of my invention more readily understood. A north stabilized PPI system is one in which the orientation of the north position remains at the same azimuth position on the face of the cathode ray oscilloscope tube viewing screen utilized in the receiving apparatus of the set regardless of the heading of the plane or ship carrying the apparatus. This position of north on the oscilloscope tube may be set in a position as selected by the operator of the apparatus by means of a differential self-synchronous generator arrangement. Used as a part of this device are a number of self-synchronous generators or transmitters, motors or receivers, and differential generators which will be referred to hereinafter as by the general term of selsyns.

Referring now more particularly to the figure, selsyn 10 is mechanically linked to the ship's or plane's compass by means of shaft 11 and its displacement is directly proportional to the compass heading or bearing of the ship or plane. Therefore, it follows that any rotation of shaft 12, which is driven by selsyn 13, will be equal to the rotation of shaft 11 where shaft 14 is kept stationary. It is to be understood that a power multiplying system may be used between selsyn 13 and selsyn 15, if desired.

There is provided selsyn 15 which may be considered as a differential selsyn which receives information from both shaft 12, whose position is proportional to the plane's or ship's heading, and shaft 16 whose position is proportional to the azimuth or direction of the antenna or device for radiating and receiving the electromagnetic radiation of the radio-object location or detection system 28, and delivers information in the form of voltages to the deflection yokes of the oscilloscope or cathode ray tube 27 used in the receiving apparatus associated with the radio-object location system, such for instance as shown in the aforementioned Alvarez application.

The rotor of selsyn 15 is excited by a sawtooth voltage obtained from the sawtooth generator 17. Such voltage generators are well known in the art and hence will not be illustrated here except schematically.

It is apparent from the above description that the presentation of the targets on the viewing screen of the oscilloscope tube will be stabilized since any change in heading by the plane is subtracted out by the rotation of shaft 11 and therefore does not produce a change in the azimuth orientation of the target presentation. It is also apparent that knob 18, by introducing a change of voltage in the differential selsyn 19, may be used to provide azimuth displacement of the target presentation.

My invention incorporates in the above-described apparatus a selsyn motor 20 and its associated phase detector 21 and PDI's 22 and 23, and the shaft 24 and gearing 25 used to displace the rotor of this selsyn. Referring again to the figure, the heading of the plane determines the angular position of shaft 11 and consequently the voltages impressed on the stator winding of selsyn 20. Assuming that the rotor of selsyn 20 is held stationary, the voltage induced in it by the stator voltages will change as the plane changes course, in accordance with the angular displacement of shaft 11. By use of the aforementioned phase detector 21 this rotor voltage is rectified and impressed on the center scale direct-current milliammeters which serve as the PDI's 22 and 23. Once the plane is on a desired course and the rotor of selsyn 20 has been positioned by means of knob 26 so that the PDI meters 22 and 23 are receiving no voltage, any deviation of the plane from this selected heading will cause a deflection of the PDI's indicating to the pilot the proper direction and amount of turn necessary in order to put the plane on the proper course.

In order to get the plane on a collision course when it is not headed in the general direction of the desired target the operator of the detection equipment closes switch 27 thereby short-circuiting the pilot's PDI 23 so that it indicates zero deflection. Then knob 18 is turned until the aircraft electronic heading mark on the screen of the oscilloscope tube of the receiving apparatus coincides with a desired radial reference line and knob 26 is promptly turned until there is no deflection on the operator's PDI 22. The pilot's PDI 23 is now switched on by opening switch 27 and knob 18 turned until the target on the oscilloscope screen is under the radial reference line. This results in an unbalance of the voltages in the stator or selsyn 20 and a voltage induced in the rotor of selsyn 20 which is in turn phase detected and applied to the PDI's, indicating that a turn is necessary to get on the desired course. The pilot makes the turn in the direction and amount as indicated by his PDI 23 thereby restoring the balance of voltages in selsyn 20 due to the rotation of shaft 11 and the action of selsyn 10 which accordingly causes the PDI's to again show zero deflection.

The plane is now heading toward the target and the ground track would indicate a collision course if there is no component of cross-wind causing a drift of the plane. However, assuming there is a cross-wind tending to cause the plane to veer off course, the target spot on the oscilloscope screen will drift away from the reference line. To correct for this drift the operator of the detection equipment double-grips knobs 18 and 26 and the target is again returned to the reference line by shifting the target display on the oscilloscope screen in azimuth. By double-gripping is meant turning both knobs simultaneously through the same angle of rotation.

The pilot's PDI 23 now indicates that another turn is necessary due to the fact that the voltages in the stator of selsyn 20 have been unbalanced by the combination of the rotation of shaft 14 and shaft 24. By means of the gear arrangement 25 shaft 24 rotates through five times as large an angle as shaft 14 when knobs 18 and 26 are double-gripped to reposition the target spot and produces a voltage in the rotor of selsyn 20 approximately proportional to the angle which the plane should travel in order to be on a collision course.

The operator continues to enter new corrections by double-gripping knobs 18 and 26, thus causing the target spot to remain on the same reference line on the screen of the oscilloscope tube. After a series of corrections by the operator and turns by the pilot, the plane will be on such a course that there is no further azimuth drift of the target spot and this will be the collision course desired. Once knobs 18 and 26 have been properly set so as to properly define this collision course the operator need not touch the controls, and any deviation from the course will be indicated on the PDI's. The angle between the reference line and the electronic heading marker will be the drift angle of the plane due to the cross-wind component.

While this description of operation has referred to the application of my invention for use on an airplane it is to be understood that it can be readily adapted for use with ships as well. It is obvious to those skilled in the art that various changes and modifications may be made to this invention without departing from the scope of the invention as set forth in the appended claims.

I claim:

1. Electrical navigation apparatus for enabling a craft to navigate a direct course to a given point, comprising: compass means; a self-synchronous generator including a rotor and a stator, said rotor being energized by an alternating current source, said generator being coupled to said compass means and responsive to variations of said compass means; a self-synchronous differential transmitter connected to said stator, for differentially transmitting variations in energy supplied thereto by said generator, a portion of said transmitter being rotatable; a self-synchronous motor and a self-synchronous control transformer each including a rotor and a stator, said stators being coupled to said transmitter and responsive to said compass means variations transmitted therethrough, the rotor of said motor being energized by an alternating current source; radio-echo location means; a differential self-synchronous generator coupled to said radio-echo location means and to the rotor of said motor; said radio-echo location means including cathode ray tube means operatively connected to said differential generator for control thereby and indicating drift from said direct course; indicating meter means coupled to the rotor of said transformer for indicating said compass means variations; means for adjusting said variable portion of said transmitter and thereby controlling the response of the rotor of said transformer to said compass means variations and also affecting the indications on said cathode ray tube; and means for adjusting the rotary position of the rotor of said transformer, coupled to said rotor, and thereby varying the response of said meter means to said compass means variations without influencing the indications shown by said cathode ray tube means; whereby a navigator on a craft can set a given course, observe any deviations from said course and cause them to be corrected, and can, as long as the cause of said deviations remains constant, so adjust said meter indicator means so that they will automatically indicate deviations of said craft from said course.

2. Electrical navigation apparatus according to claim 1, and further including a step-up rotation transmission between said rotor adjusting means and the rotor of said transformer, whereby the rotor of said transformer may be rotated more rapidly than said rotatable portion of said transmitter.

3. Navigation apparatus according to claim 2, wherein said transmission step-up has a step-up ratio of 5 to 1.

4. Navigation apparatus according to claim 1, wherein said indicator meter means consist of at least two milliammeters, one located at the navigator's position and one at the position of the pilot of said craft, and further including a phase detector between said meter means and the rotor of said transformer.

5. Navigation apparatus according to claim 4 and further including a step-up rotation transmission between said rotor adjusting means and the rotor of said transformer, whereby the rotor of said transformer may be rotated more rapidly than said rotatable portion of said transmitter.

6. Electrical navigation apparatus for enabling a craft to navigate a direct course to a given point, comprising: first compass means; a self-synchronous differential transmitter coupled to said compass means and responsive to its variations; second radio-echo location means for locating the given navigation point; third cathode ray tube means coupled to said differential transmitter and said second means, for indicating drift from said course; fourth means connected to said differential transmitter for varying the coupling between said transmitter and said compass means in order to cancel said drift indication on said cathode ray tube means; fifth meter means for measuring the differential transmitter energy variation when said fourth means is varied; and sixth means for variably coupling said meter means to said transmitter.

7. Navigation apparatus according to claim 6, wherein said fourth means is rotatable, and further including seventh means for rotatively varying said sixth means.

8. Navigation apparatus according to claim 7, and further including a step-up rotation transmission connected between said seventh means and said sixth means.

9. Navigation apparatus according to claim 8, wherein said step-up transmission has a step-up ratio of 5 to 1.

ADDISON D. COLE.

REFERENCES CITED

The following references are of record in the file of this patent:

UNITED STATES PATENTS

| Number | Name | Date |
|---|---|---|
| 1,958,259 | Becker | May 8, 1934 |
| 2,207,709 | Bates | July 16, 1940 |
| 2,288,102 | Meredith | June 30, 1942 |
| 2,308,936 | Schuchardt | Jan. 19, 1943 |
| 2,384,004 | Bechberger | Sept. 4, 1945 |
| 2,385,204 | Hanna | Sept. 18, 1945 |
| 2,495,753 | Mozley | Jan. 31, 1950 |